(12) United States Patent
Jokela et al.

(10) Patent No.: US 9,154,571 B2
(45) Date of Patent: Oct. 6, 2015

(54) PUBLISH/SUBSCRIBE NETWORKS

(75) Inventors: Petri Jokela, Espoo (FI); Pekka Nikander, Jorvas (FI); Teemu Rinta-Aho, Espoo (FI); Mikko Särelä, Kauniainen (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 140 days.

(21) Appl. No.: 12/816,442

(22) Filed: Jun. 16, 2010

(65) Prior Publication Data

US 2010/0312898 A1    Dec. 9, 2010

Related U.S. Application Data

(63) Continuation of application No. PCT/EP2007/064212, filed on Dec. 19, 2007.

(51) Int. Cl.
    *G06F 15/16*    (2006.01)
    *H04L 29/08*    (2006.01)
    *H04L 29/06*    (2006.01)

(52) U.S. Cl.
    CPC ............ *H04L 67/2823* (2013.01); *H04L 67/28* (2013.01); *H04L 69/08* (2013.01)

(58) Field of Classification Search
    USPC ........................................................ 709/227
    See application file for complete search history.

(56) References Cited

U.S. PATENT DOCUMENTS

| | | | |
|---|---|---|---|
| 6,392,999 B1 * | 5/2002 | Liu et al. | 370/260 |
| 6,611,862 B2 * | 8/2003 | Reisman | 709/217 |
| 6,658,464 B2 * | 12/2003 | Reisman | 709/219 |
| 6,769,009 B1 * | 7/2004 | Reisman | 709/201 |
| 7,010,303 B2 * | 3/2006 | Lewis et al. | 455/445 |
| 7,334,038 B1 * | 2/2008 | Crow et al. | 709/227 |
| 7,389,358 B1 * | 6/2008 | Matthews et al. | 709/238 |
| 7,415,548 B2 * | 8/2008 | Mahany et al. | 710/18 |
| 7,529,230 B2 * | 5/2009 | Lewis et al. | 370/352 |
| 7,552,246 B2 * | 6/2009 | Mahany et al. | 710/18 |

(Continued)

FOREIGN PATENT DOCUMENTS

| | | |
|---|---|---|
| WO | 2004072800 A2 | 8/2004 |
| WO | 2004080030 A1 | 9/2004 |

OTHER PUBLICATIONS

Pietzuch, P.R., et al. "Hermes: A Distributed Event-Based Middleware Architecture", Proceedings of the 22nd ICDCSW'02, Jul. 2, 2002, 8 pages.

(Continued)

*Primary Examiner* — Hua Fan
(74) *Attorney, Agent, or Firm* — Rothwell, Figg, Ernst & Manbeck, P.C.

(57) ABSTRACT

A method of making data, published on a first publication/subscribe (pubsub) network, available to hosts within a second publication/subscribe network where the networks are interconnected via the Internet. The method comprises registering a publication identity of said data within a rendezvous system located within the Internet, forwarding Subscribe requests associated with said publication identity from said second network to said rendezvous system and, at the rendezvous system, identifying a location of said data within said first network. The Subscribe request can then be forwarded to said first network, and said data delivered from said first network to said second network via the Internet.

16 Claims, 6 Drawing Sheets

(56) References Cited

U.S. PATENT DOCUMENTS

| | | | |
|---|---|---|---|
| 7,899,951 B2* | 3/2011 | Mahany et al. | 710/18 |
| 7,958,242 B2* | 6/2011 | Rey | 709/227 |
| 8,090,839 B2* | 1/2012 | Kumar et al. | 709/227 |
| 2002/0099854 A1* | 7/2002 | Jorgensen | 709/249 |
| 2003/0220990 A1* | 11/2003 | Narayanan et al. | 709/220 |
| 2004/0088347 A1* | 5/2004 | Yeager et al. | 709/202 |
| 2005/0132060 A1* | 6/2005 | Mo et al. | 709/227 |
| 2007/0005786 A1* | 1/2007 | Kumar et al. | 709/230 |
| 2007/0005801 A1* | 1/2007 | Kumar et al. | 709/238 |
| 2007/0016910 A1* | 1/2007 | Roberts | 719/313 |
| 2007/0028001 A1* | 2/2007 | Phillips et al. | 709/238 |
| 2007/0156919 A1* | 7/2007 | Potti et al. | 709/238 |
| 2007/0174467 A1* | 7/2007 | Ballou et al. | 709/227 |
| 2008/0215751 A1* | 9/2008 | Dorai et al. | 709/238 |
| 2009/0089408 A1* | 4/2009 | Bou-Diab et al. | 709/220 |
| 2009/0172170 A1* | 7/2009 | Rey | 709/227 |
| 2010/0217837 A1* | 8/2010 | Ansari et al. | 709/218 |
| 2010/0241748 A1* | 9/2010 | Ansari et al. | 709/225 |
| 2011/0013557 A1* | 1/2011 | Westberg et al. | 370/328 |

OTHER PUBLICATIONS

Cao, F., et al., "MEDYM: Match-Early with Dynamic Multicast for Content-Based Publish-Subscribe Networks", Jan. 1, 2005, G. Alonso (Ed.): Middleware 2005, LNCS 3790, pp. 292-313.

Guimaraes, M., et al., "A Genetic Algorithm for Multicast Mapping in Publish-Subscribe Systems", Proceedings of the Second IEEE International Symposium on Network Computing and Applications (NCA'03), Apr. 16, 2003, 8 pages.

Koponen, T., et al., "A Data-Oriented (and Beyond) Network Architecture" SIGCOMM'07, Aug. 31, 2007, XP008096023.

IPRP issued in PCT Application No. PCT/EP2007/064212, Feb. 10, 2010, 8 pages.

Official Action issued on May 22, 2014 in corresponding European Application No. 07857834.1, 5 pages.

Koponen, T., et al., "A Data-Oriented (and Beyond) Network Architecture", SIGCOMM'07, Aug. 2007, Kyoto Japan, pp. 181-192.

\* cited by examiner

PUBLISH/SUBSCRIBE NETWORKS

CROSS-REFERENCE TO RELATED APPLICATION

This application is a continuation of Application No. PCT/EP2007/064212, filed Dec. 19, 2007 and is incorporated by reference herein.

TECHNICAL FIELD

The present invention relates to publish/subscribe networks and in particular to a method and apparatus for interconnecting discrete publish/subscribe networks.

BACKGROUND

The Internet was created primarily as a means for establishing point-to-point connections between hosts: It utilised host-to-host applications such as ftp and telnet. The historical origins of the Internet have resulted in it having a focus on hosts and end points as primary named entities, i.e. hosts are identified by URLs and endpoints are identified by IP addresses (although in many cases a host is also an endpoint). This focus creates a number of well known problems. For example, the current inter-networking paradigm provides an open network which is not well suited when some users are selfish and others malicious. There is nothing inherent in the Internet architecture to prevent an attacker flooding an IP address with traffic resulting in the party "owning" that IP address potentially being denied access to the Internet. A further problem is that the Internet does not provide an inherent mechanism for the authentication of data. For example, a user retrieving a web page using an http GET and a published URL has no way of knowing if the retrieved data is authentic.

The Internet has now evolved into a system which is used primarily for data retrieval and service access. Indeed, much of the data accessed over the Internet is static, i.e. it does not change, at least in the short term. Even a dynamic web page is likely to consist of a number of static components that are glued together with a small amount of client-specific (i.e. variable) HTML code. Generalising, it can be argued that, with the possible exception of real-time interactive traffic such as voice calls, the majority of current network traffic is data oriented. The (user) applications making use of the Internet are not interested in creating connections, but rather in transferring well defined pieces of data. Whilst mechanisms such as multicasting and peer-to-peer networks address some of the specific issues, these do not address the fundamental deficiencies present in the Internet.

A network paradigm known as "publish/subscribe" or "pubsub" is being developed and addresses many of these fundamental deficiencies. The paradigm is based upon identifying data within the pubsub network using a publication identifier which is cryptographically bound to the data. The publication identifier may be for example a hash of a private key owned by the publisher of the data. The publisher then attaches to the data a signature taken over the data using the associated private key and publishes the data on the network. The data may be held at a number of different locations. In order to retrieve data, a user sends a Subscribe message containing the publication identifier and his own location, to a local router. The router uses some rendezvous system to locate a copy of the data (typically the closest copy) and routes the Subscribe message to that location. Within an autonomous system, e.g. a network owned by a single operator, the rendezvous system may comprise a single rendezvous server that maintains a mapping between publication identities and data locations. A copy of the data with signature and public key is delivered to the requesting user via some optimised route. The user does not necessarily know or care from which location the data is retrieved. Moreover, the pubsub network does not require a separate DNS lookup to be performed in order to resolve a URL into an IP address. Rather, the Subscribe message acts both as source locator and data request.

Within a pubsub network, routers will only deliver data in the event that a Subscribe message has been received from a destination. Flooding attacks which result in a denial of service are thereby effectively prevented.

It is likely that in the short to medium term pubsub networks will be established as standalone networks, i.e. "islands", which use gateways to connect to the Internet. It can be envisaged that a user attached to one pubsub island will want to retrieve data from another pubsub island via the Internet (or possibly another IP network). In this case, the user might send a Subscribe message to a local router and which contains a publication identity for the data. Assuming that the router is appropriately configured, it may recognise that the publication identity is not a local identity, and will forward it to the Internet gateway. The present DNS system does not however provide any means to perform a reverse mapping between a publication identity and an IP address of a remote node, in this case a location at which the requested data is held.

SUMMARY

It is an object of the present invention to address the above noted problem. This is achieved by connecting the local rendezvous systems of the pubsub networks together using a rendezvous system based within an IP network, e.g. the Internet.

According to a first aspect of the present invention there is provided apparatus for use within a communication network, where the network comprises a local rendezvous system in which data is published using a publication identifier and which is used by local hosts to retrieve published data. The apparatus is configured to be coupled in use to an IP network and is further configured to receive from a local host a Subscribe request relating to the publication identifier, send a further Subscribe request relating to said publication identifier, to a Dissemination Handler of a rendezvous system residing within the IP network, receive over said IP network data published with said publication identifier, and route the received data to said local host.

In a preferred embodiment of the invention, the apparatus is configured to establish a TCP session with a peer node following sending of said further Subscribe request, said data being received within said session. The peer node may be a peer gateway node or an IP network host. In either case, the apparatus treats said Subscribe request as a TCP SYN message.

The invention may be employed to allow a pubsub network to subscribe to an IP multicast. In this case, the apparatus is configured to receive from the rendezvous system residing within the IP network a response to said Subscribe request, the response containing an IP multicast group address, and to send a multicast Join request to said group address.

According to a second aspect of the present invention there is provided apparatus for use within a communication network, where the network comprises a local network having a local rendezvous system in which data is published using a publication identifier and which is used by local hosts to retrieve published data. The apparatus is configured to be coupled in use to an IP network and being further configured to receive from a local host within the local network a Publish request relating to a publication identifier, send a further Publish request relating to said publication identifier, to a Dissemination Handler of a rendezvous system residing within the IP network, receive from said rendezvous system a Subscribe request relating to said publication identifier, and deliver over said IP network to a subscribing host, data published with said publication identifier.

According to a third aspect of the present invention there is provided a method of making data, published on a first publication/subscribe network, available to hosts within a second publication/subscribe network where the networks are interconnected via an IP network. The method comprises registering a publication identity of said data within a rendezvous system located within said IP network, forwarding Subscribe requests associated with said publication identity from said second network to said rendezvous system, at the rendezvous system, identifying a location of said data within said first network and forwarding the Subscribe request to said first network, and delivering said data from said first network to said second network via the IP network.

According to a fourth aspect of the present invention there is provided a method of making data, published on a first publication/subscribe network, available to hosts within a second publication/subscribe network where the networks are interconnected via an IP network. The method comprises registering a publication identity of said data and a corresponding multicast group address within a rendezvous system located within said IP network, forwarding Subscribe requests associated with said publication identity from said second network to said rendezvous system, at the rendezvous system, identifying the multicast group address and returning this to the second network, and sending a multicast Join request from said second network to said group address.

DETAILED DESCRIPTION

As described above, a pubsub network will use publication identities in order to identify and locate data published on the network. A rendezvous system within the network will route Subscribe messages from a subscriber to the published data. In order to allow isolated pubsub networks to be linked together in an efficient manner via the Internet, a further rendezvous system should be provided within the Internet.

It is proposed here to make use of a rendezvous system overlaid on the existing Internet and which identifies data using "flat name" identities, that is identities which do not have a hierarchical structure, e.g. "username.company.com". Flat names are desirable as they do not have a strict coupling with network topology and thus an attacker cannot use them to deduce details of topology (or to send unwanted traffic to a chosen point in a topology). This decoupling between topology and naming also simplifies multi-homing and mobility. Flat names also make it possible to cache data in multiple locations and to retrieve it from an optimal location (i.e. the closest). Furthermore, it is proposed here to make use of a rendezvous system which implements location identification and data retrieval initiation essentially in a single step.

In order to address many of the shortcomings of the conventional Internet, a clean-slate redesign known as Data Oriented Network Architecture (DONA) has been proposed: "A Data-Oriented (and Beyond) Network Architecture", Koponen, T. et al, I. Proceedings of the Sigcomm 2007, pages 181-192, ACM Press New York, N.Y., USA. DONA aim to provide persistence, availability, and authenticity to data allowing the data to be cached and moved without affecting its reachability. The naming system proposed by DONA provides names that are self-certifying and of the form P:L, where P is a cryptographic hash of the principal's (publisher's) public key, and L is a string chosen by the principal.

Figure 1:
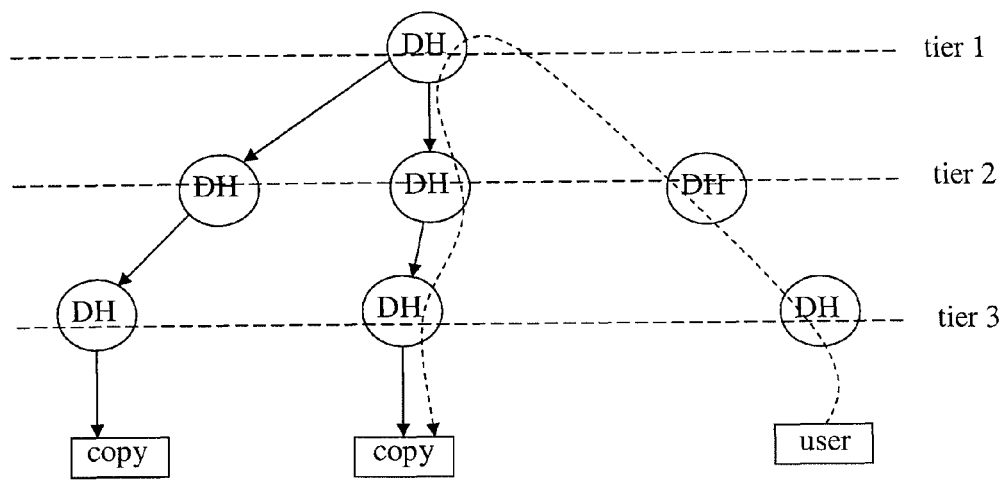
FIG. 1 illustrates schematically a DONA architecture.

The DONA architecture is illustrated schematically in FIG. 1 and consists of Dissemination Handlers (DH), sometimes referred to as Resolution Handlers. Typically one, although possibly more, DH will be located within each autonomous system (AS). It is envisaged that the layers of the DH hierarchy will be mapped to tiers of the Internet service provision business model. Tier 1 DHs will be located within the networks of those global service providers that do not buy transit from other networks. Tier 2 DHs will be located within the networks of service providers that both peer with other networks and buy transit from tier 1 ASs. Tier 3 DHs will be located within the networks of service providers that do not peer with other networks, and only buy transit from tier 1 or tier 2 ASs. The mapping of the DH architecture to the business model ensures that higher tier networks have a supplier/customer relationship with the networks below them and whose DHs require the services of the higher tier DHs.

The DHs support two primitives: FIND(P:L) and REGISTER (P:L). When a DH receives a REGISTER(P:L) from a client, i.e. the publisher, it puts the publication identity and the location information (e.g. an IP address) in its cache and forwards the request to a higher layer DH and peer DHs. Thus, the DH of a tier 1 AS will have location information for all registered publications. When a client, that is the subscriber, sends a FIND (P:L) request to a local DH, that DH either determines the location of the nearest copy of the publication in its registration table and forwards the request to that location, or forwards the request to a higher tier DH which repeats the process.

DHs may act as local caches for published data in addition to handling routing of Subscribe requests. Thus, a DH receiving a Subscribe request may first check its local cache to determine whether or not the requested data is held in the cache. If so, the data is provided directly from the cache and there is no need to forward the request further.

As has already been discussed, when a publisher publishes data in a pubsub network, availability information concerning that data is created within a local rendezvous system. In order to cope efficiently with a transition phase during which both pubsub networks and the Internet coexist, it is proposed here to use DONA as a rendezvous mechanism for interconnecting pubsub network islands using the Internet as the routing and forwarding mechanism. A gateway node (GW) in the pubsub network is responsible for translating the pubsub publication identity into a form used in the DONA system, i.e. P:L. The gateway node effectively operates as a DONA DH, publishing data in the DONA system and providing its own IP address as the actual location of the data. The composite architecture is illustrated schematically in FIG. 2.

Consider the case where a user (of the pubsub network) Host A 1 subscribes to a data item and it is not found from the rendezvous system of the local pubsub network 2. The request is therefore routed via the gateway node 3 of that pubsub network into the DONA system 4 which is located within the Internet 5. The DONA system in turn identifies the publication and the IP address of the gateway node 6 of the pubsub network 7 within which the published data is located. The DONA system forwards the Subscribe message to that gateway node 6, including in the message the IP address of the gateway node 3 associated with the requesting user 1. The publishing side gateway node 6 can then deliver the requested data over the Internet 5 to the subscribing side gateway node 3 using the existing IP routing system.

Transmission over the Internet between gateway nodes may be protected and the gateway nodes may authenticate each other using some appropriate mechanism. For example, the gateway nodes may use the Host Identity Protocol (HIP) in order to establish security associations between themselves.

Figure 2:
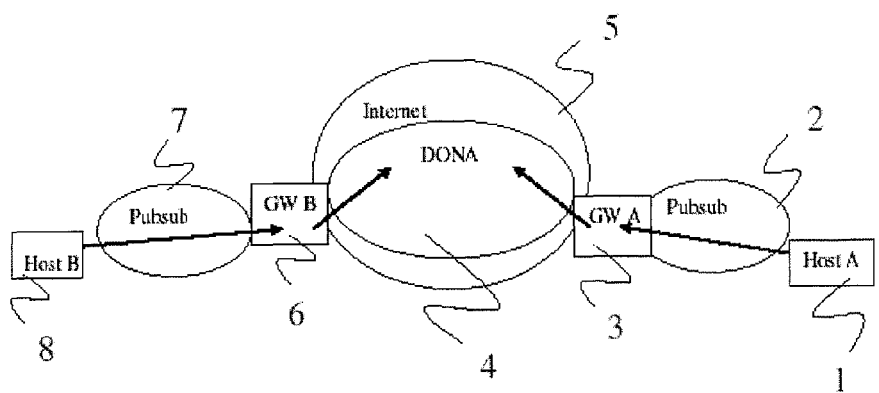
FIG. 2 illustrates schematically the use of a DONA architecture to interconnect a pair of pubsub networks.
Figure 3:
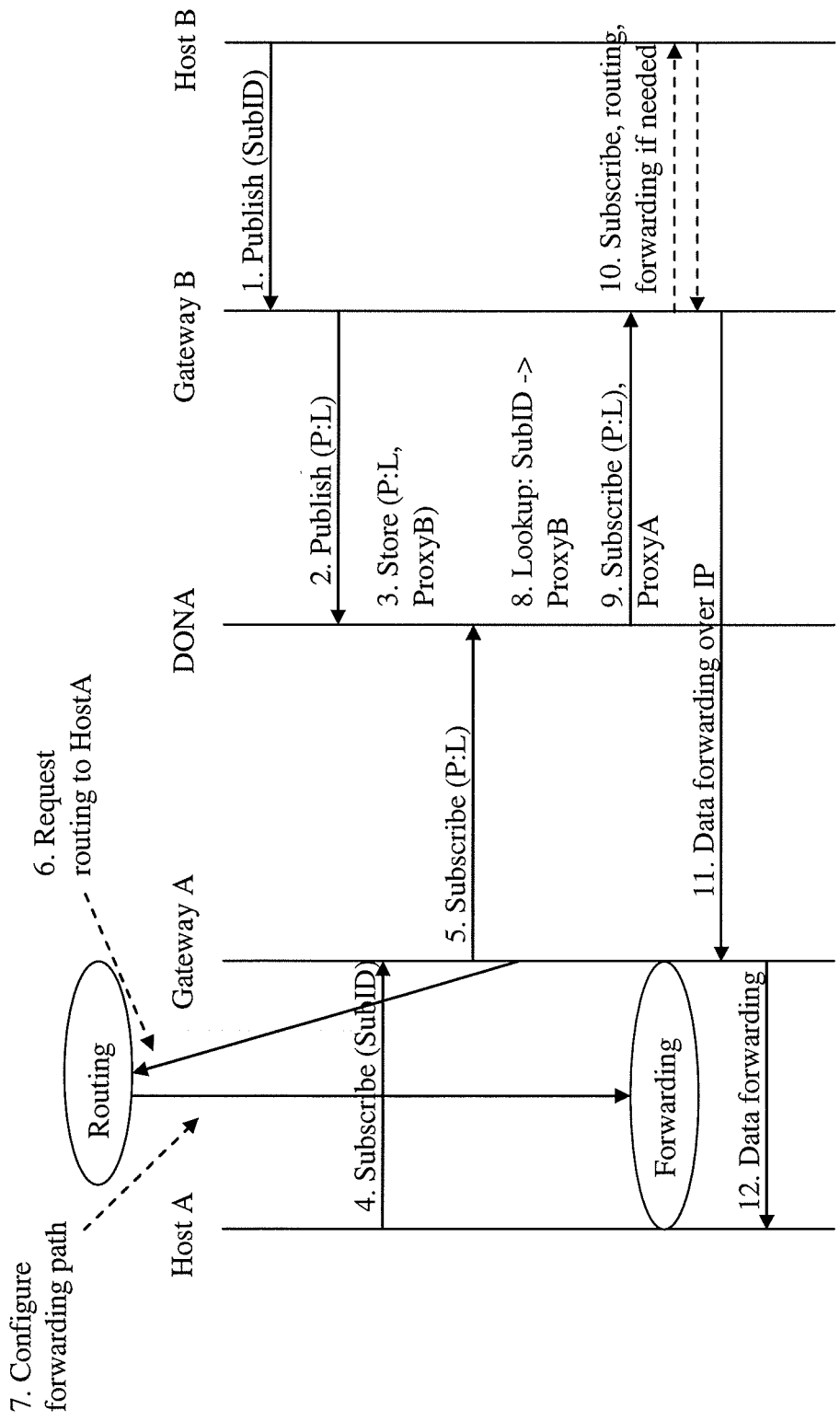
FIG. 3 shows a signalling flow associated with the publication of data from a pubsub network on a DONA system, and a subsequent subscription to that data.

FIG. 3 illustrates an exemplary signalling flow within the composite architecture of FIG. 2. The following steps can be identified:

(1) Host B publishes data with a publication identifier SubID. A route to the data is stored into the local Rendezvous system from where it is available directly to other local pubsub hosts. This route could be Ethernet or MAC address, plus Ethernet routing.

(2) Gateway B then maps the publication identifier SubID to a DONA name P:L, where P is a cryptographic hash of a public key of the gateway and L is a unique identifier allocated to the published data by Gateway B. Gateway B publishes the data information in the DONA system as if it were itself a DH, giving its IP address as the location for the data, i.e. it publishes the mapping P:L to IP address.

(3) The DONA system stores the published mapping. This involves disseminating the mapping amongst the DHs.

(4) Host A subscribes to data with identity SubID.

(5) Gateway A determines that this data is not available at the local network (this determination may require a query to the local rendezvous system) and therefore sends a query to the DONA system.

(6) While it awaits a response from the publisher, Gateway A contacts the routing function within the local pubsub network in order to build a forwarding path from itself to the subscriber Host A.

(7) The local routing function creates the path and configures the forwarding tables within routers in the path. NOTE: Steps 6 and 7 may occur later in the process, for example if Gateway A wants to be sure that the data will be delivered, prior to establishing the local routing path.

(8) The DONA system performs a lookup in its rendezvous system (see for example FIG. 1) and determines that the publication is not available in the DONA system (i.e. it has not been cached previously at one of the DHs) but that it can be ordered from Gateway B.

(9) The DONA system sends a Subscription to Gateway B ("ProxyB"), identifying the subscribing host Gateway A by including Gateway A's IP address ("ProxyA") in the packet header. The Subscribe request may be considered by Gateway B to be a TCP SYN.

(10) Assuming that the data is not cached at Gateway B, the data needs to be subscribed from the local pubsub network. This step involves requesting the data from Host B (or other node, e.g. a network server) and building the forwarding path between Host B and Gateway B.

(11) The data is forwarded between Gateway B and Gateway A using standard IP forwarding mechanisms. In the case of TCP, Gateway B replies (to the TCP SYN) by sending a TCP SYN+ACK to the IP address of Gateway A.

(12) The data received at Gateway A is forwarded using the forwarding path configured at step 7.

The approach described above can be adapted in order to allow data to be retrieved by a pubsub network host from an Internet host (for example the host 9 in FIG. 2) that uses DONA to publish its data. When the Internet host 9 publishes its data, a DONA identifier (P:L) for the data is inserted in the DONA system as described earlier, i.e. steps 2 and 3 above. When a pubsub gateway requests the published data (steps 5 to 6 above), the request is routed to the closest location of the data (which may be a DH if the data has been cached there, or the publishing host). This request packet is considered by the destination to be a TCP SYN packet. The rest of the TCP communication setup (server SYN-ACK and client ACK) is carried out directly between the data location and the gateway node. Finally, the data is transmitted over the TCP connection to the gateway node. After the gateway node has received the data, it converts it into the publication format (e.g. by replacing the IP headers with pubsub headers) that is used in the pubsub network and publishes it locally so that is available for the subscribing host (in practice this may means sending the data to the host over the pubsub network).

Figure 4:
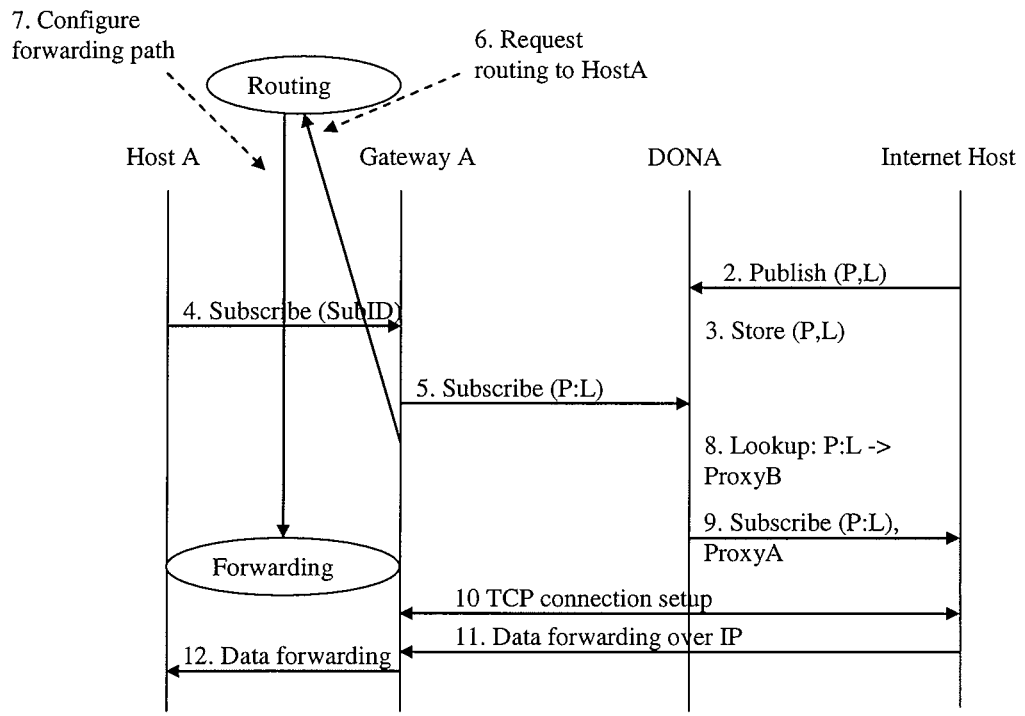
FIG. 4 shows a signalling flow associated with the publication of data from an Internet host on a DONA system, and a subsequent subscription to that data.

FIG. 4 illustrates a signalling flow for the case where the data publisher is an Internet host. The flow is similar to that illustrated in FIG. 3, except that the publish and subscribe requests are exchanged directly between the DONA system and the Internet host and no gateway (i.e. Gateway B) is involved.

Figure 5:
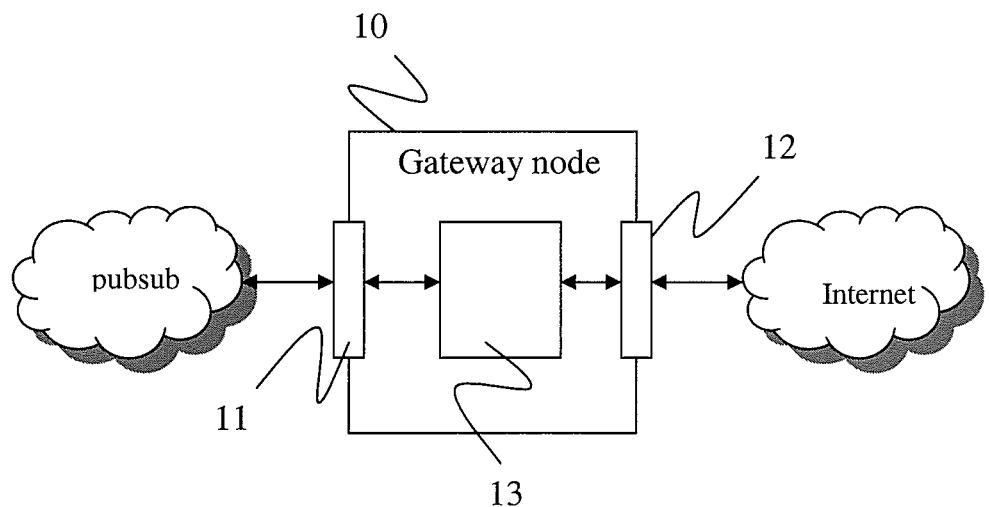
FIG. 5 illustrates schematically a gateway node of a pubsub network and embodying the present invention.

FIG. 5 illustrates schematically a gateway node 10 for use in the system described above. The node comprises a first interface 11 for connecting the gateway to the pubsub network and a second interface 12 for connecting the gateway node to the Internet. A processor 13 is responsible for forwarding Subscribe request received from the pubsub network to the DONA system and for establishing TCP connections with peer gateways. The processor also handles incoming Subscribe requests from peer gateways.

Figure 6:
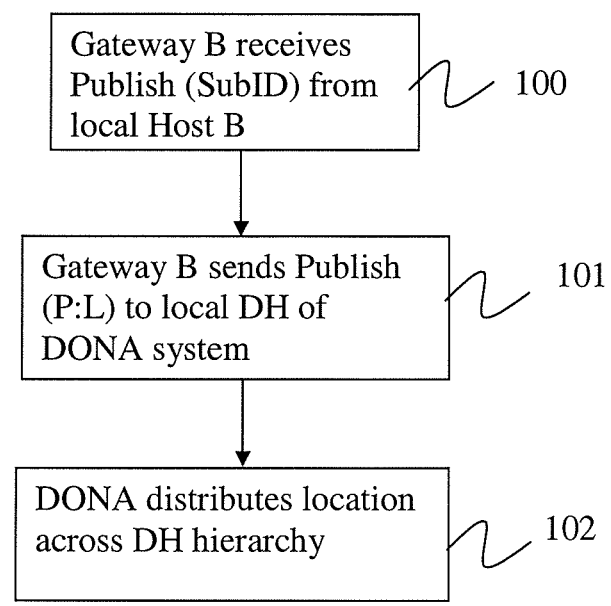
FIG. 6 is a flow diagram illustrating a process for publishing data in the system of FIG. 2.

The flow diagram of FIG. 6 illustrates the processes of publishing data on the DONA system. At step 100, Gateway B receives a Publish (SubID) request from local Host B and at step 101 sends the request to a DH of the DONA system. At step 102 the DONA system distributes the publication location across the DH hierarchy.

Figure 7:
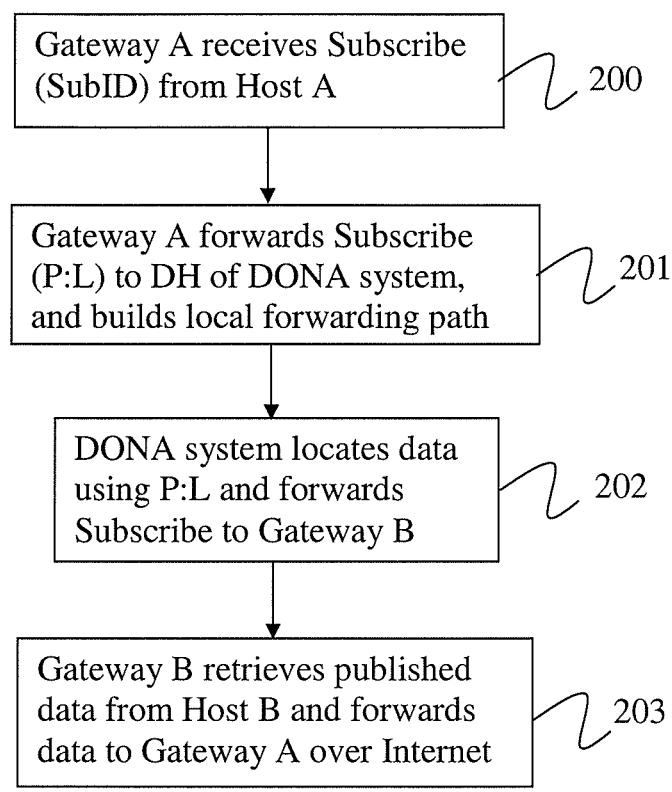
FIG. 7 is a flow diagram illustrating a process for subscribing to published data in the system of FIG. 2.

The flow diagram of FIG. 7 illustrates the processes of retrieving data via the DONA system. At step 200, Gateway A receives a Subscribe (SubID) message from Host A, translates the SubID to a P:L, and at step 201 forwards the message to a DH of the DONA system. Gateway A then builds the local forwarding path. At step 202, the DONA system locates the data using P:L and forwards the Subscribe request to Gateway B. At step 203, Gateway B retrieves the published data from Host B and forwards the data to Gateway A over the Internet.

Figure 8:
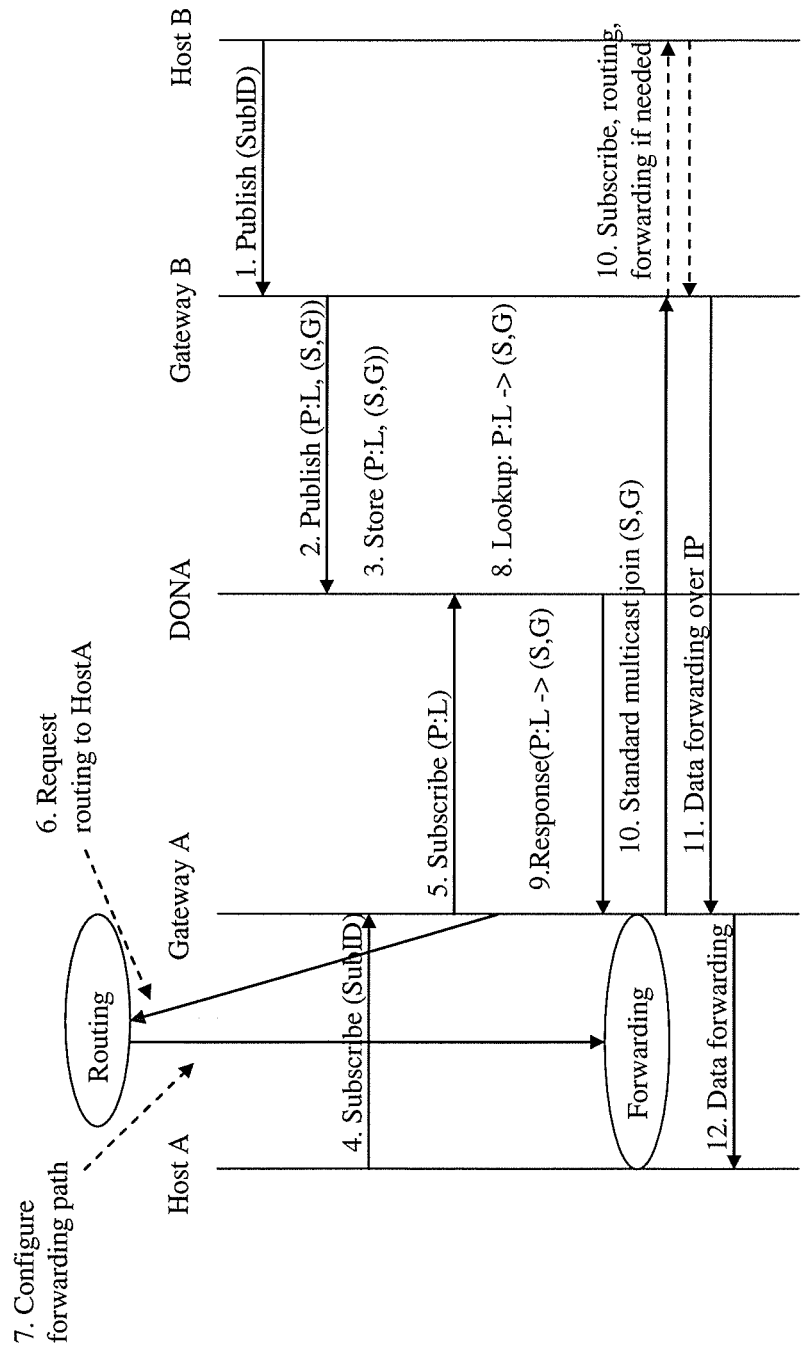
FIG. 8 shows a signalling flow associated with the publication of data by way of a multicast from a pubsub network on a DONA system, and a subsequent subscription to that multicast data.

The DONA system may be used by pubsub networks to publish data by way of an IP multicast, and to subscribe to such multicasts. A signalling flow associated with this scenario is shown in FIG. 8. The flow is generally in line with that illustrated in FIG. 3, except that at step 2 Gateway B publishes the data location by way of the source address S (i.e. IP address at which the data is located) and a group address G conforming to the multicast standard. When the DONA system subsequently receives a Subscribe request addressed to P:L (following translation of the local SubID at Gateway A) and which maps to the multicast address (S,G), the DONA system responds to Gateway A with the group address. At step 10 Gateway A sends a standard multicast JOIN request to the group address. This request is routed to Gateway A, allowing the multicast path to be built.

It will be appreciated by the person of skill in the art that various modifications may be made to the above described embodiments without departing from the scope of the present invention.

The invention claimed is:

1. An apparatus for use within a communication network, where the network comprises a local rendezvous system in which published data is published using a local publication identifier identifying the published data, the apparatus being configured to be coupled in use to an IP network and being further configured to:
    maintain a mapping in the apparatus between said local publication identifier identifying the published data and an overlaid network publication identifier also identifying the published data, wherein the overlaid network publication identifier is not an IP address and the local publication identifier is not an IP address;
    receive from a local host a first subscribe request including said specified local publication identifier;
    in response to receiving the first subscribe request, (i) determine the overlaid network publication identifier mapped to the specified local publication identifier and (ii) send a second subscribe request comprising said determined overlaid network publication identifier to a dissemination handler of an overlaid rendezvous system residing within the IP network;
    receive over said IP network data published with said overlaid network publication identifier; and
    route the received data to said local host.

2. The apparatus according to claim 1, wherein the apparatus is further configured to establish a session with a peer node following sending of said second subscribe request, said data being received within said session.

3. The apparatus according to claim 2, wherein said session is a Transport Control Protocol Session.

4. The apparatus according to claim 2, wherein said peer node is a peer gateway node or an IP network host.

5. The apparatus according to claim 1, wherein the apparatus is further configured to treat said subscribe request as a TCP SYN message.

6. The apparatus according to claim 1, wherein the apparatus is configured to initiate building of a local routing path between itself and said local host, following receipt of said first subscribe request.

7. The apparatus according to claim 1, wherein the apparatus is operable to receive from the rendezvous system residing within the IP network a response to said second subscribe request, the response containing an IP multicast group address, and is configured to send a multicast Join request to said group address in response to receiving the response to the second subscribe request.

8. The apparatus of claim 1, wherein the overlaid network publication identifier comprises a cryptographic hash of a public encryption key (P) and a string (L).

9. A method performed by a first network node, the method comprising:
    maintaining a mapping between a local publication identifier and an overlaid network publication identifier, wherein a set of data is associated with the local publication identifier, wherein the overlaid network publication identifier is not an IP address and the local publication identifier is not an IP address;
    receiving from a local host a first subscribe request containing said local publication identifier;
    in response to receiving the first subscribe request, (i) determining the overlaid network publication identifier mapped to the local publication identifier and (ii) sending to a dissemination handler of a rendezvous system residing within an IP network a second subscribe request comprising said determined overlaid network publication identifier, wherein the rendezvous system maintains a mapping between the overlaid network publication identifier and a network address of a second network node; and
    receiving from the second network node the set of data associated with the local publication identifier.

10. The method according to claim 9, wherein the first network node receives the data from the second network node via the Internet.

11. The method according to claim 10, wherein the first network node is a first gateway and the second network node is a second gateway.

12. The method according to claim 11, wherein
    the rendezvous system is configured to transmit to the second gateway a third subscribe request in response to receiving the second subscribe request, the third subscribe request comprising a network address of the first gateway and the overlaid network publication identifier, and
    the method further comprises establishing a TCP session between said gateways following receipt of said third subscribe request at the second gateway.

13. The method according to claim 9, wherein said rendezvous system comprising a plurality of dissemination handler storing mappings between publication identities and locations.

14. The method according to claim 13, wherein said dissemination handlers are arranged in a hierarchical structure, and wherein if a dissemination handler receives a Subscribe request containing a publication identifier for which it does not possess a mapping, the dissemination handler forwards the request to a higher tier dissemination handler.

15. The method according to claim 9, wherein said local publication identifier is a flatname.

16. Previously Presented) The method of claim 9, wherein the overlaid network publication identifier comprises a cryptographic hash of a public encryption key (P) and a string (L).

* * * * *

UNITED STATES PATENT AND TRADEMARK OFFICE
CERTIFICATE OF CORRECTION

PATENT NO. : 9,154,571 B2  
APPLICATION NO. : 12/816442  
DATED : October 6, 2015  
INVENTOR(S) : Jokela et al.

Page 1 of 1

It is certified that error appears in the above-identified patent and that said Letters Patent is hereby corrected as shown below:

In the claims

In Column 8, Line 58, in Claim 16, delete "Previously Presented) The" and insert -- The --, therefor.

Signed and Sealed this
Twenty-third Day of February, 2016

Michelle K. Lee
*Director of the United States Patent and Trademark Office*